United States Patent
Kulakowski et al.

(10) Patent No.: US 10,645,791 B2
(45) Date of Patent: May 5, 2020

(54) SWIRL RING FOR A PLASMA ARC TORCH

(71) Applicant: Hypertherm, Inc., Hanover, NH (US)

(72) Inventors: Dennis Kulakowski, Corinth, VT (US); Christopher Pillsbury, Lebanon, NH (US); David W. Lewis, Uniontown, OH (US)

(73) Assignee: Hypertherm, Inc., Hanover, NH (US)

( * ) Notice: Subject to any disclaimer, the term of this patent is extended or adjusted under 35 U.S.C. 154(b) by 318 days.

(21) Appl. No.: 15/852,240

(22) Filed: Dec. 22, 2017

(65) Prior Publication Data

US 2018/0184512 A1 Jun. 28, 2018

Related U.S. Application Data

(60) Provisional application No. 62/438,538, filed on Dec. 23, 2016.

(51) Int. Cl.
*H05H 1/34* (2006.01)
*B23K 10/02* (2006.01)

(52) U.S. Cl.
CPC ............ *H05H 1/34* (2013.01); *B23K 10/02* (2013.01); *H05H 2001/3468* (2013.01)

(58) Field of Classification Search
CPC .... H05H 1/34; H05H 1/26; H05H 2001/3468; B23K 9/24; B23K 10/00; B23K 10/02
USPC ..... 219/121.48–121.52; 313/231.31, 231.41; 315/111.21
See application file for complete search history.

(56) References Cited

U.S. PATENT DOCUMENTS

| | | | | |
|---|---|---|---|---|
| 8,089,025 B2* | 1/2012 | Sanders | ................... | H05H 1/28 219/121.49 |
| 8,338,740 B2* | 12/2012 | Liebold | ................... | H05H 1/28 219/121.5 |
| 8,698,036 B1* | 4/2014 | Zhang | ..................... | H05H 1/34 219/121.49 |
| 9,642,236 B2* | 5/2017 | Mather | .................... | B23K 9/32 |
| 10,456,855 B2* | 10/2019 | Sanders | ............... | B23K 37/003 |
| 2010/0078408 A1 | 4/2010 | Liebold et al. | | |
| 2015/0319836 A1* | 11/2015 | Sanders | ................... | H05H 1/34 219/121.49 |
| 2016/0050740 A1 | 2/2016 | Zhang et al. | | |

FOREIGN PATENT DOCUMENTS

EP   0961527 A1   12/1999

* cited by examiner

*Primary Examiner* — Lien M Ngo
(74) *Attorney, Agent, or Firm* — Proskauer Rose LLP

(57) ABSTRACT

A swirl ring for a plasma arc torch is provided. The swirl ring comprises a hollow body having a distal end and a proximal end and configured to receive at least a portion of an electrode within the hollow body. The swirl ring also comprises a first set of flange segments circumferentially disposed on an interior surface of the hollow body. The first set of flange segments extend radially inward from the interior surface and shaped to retain a first surface of a sealing member. The swirl ring further comprises a second set of flange segments circumferentially disposed on the interior surface of the hollow body. The second set of flange segments extend radially inward from the interior surface and shaped to retain a second surface of the sealing member.

21 Claims, 6 Drawing Sheets

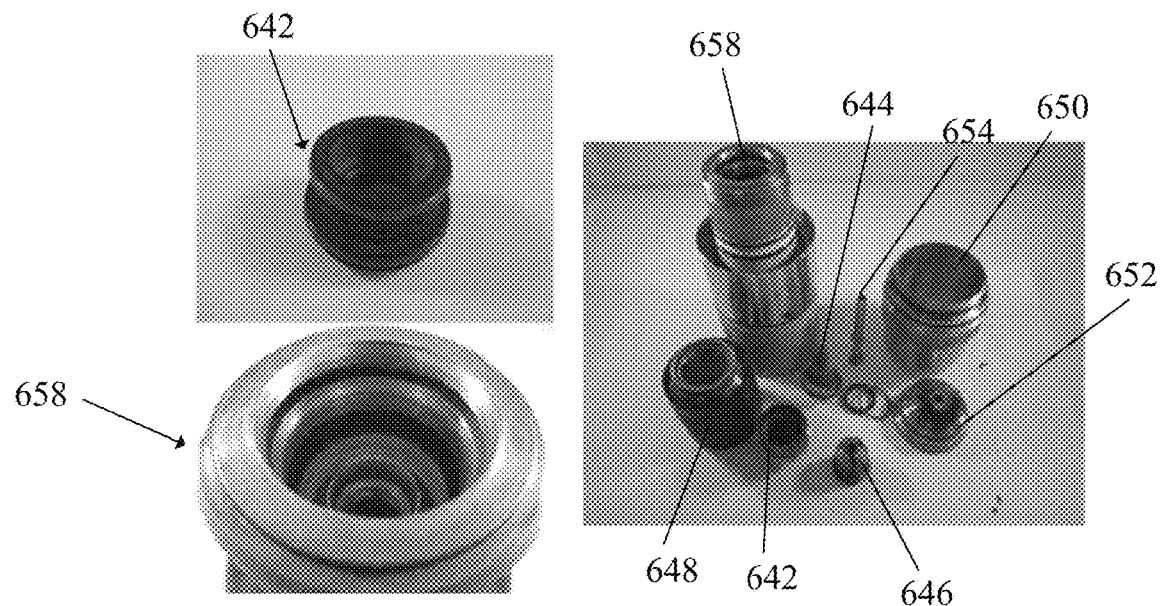
FIG. 6c
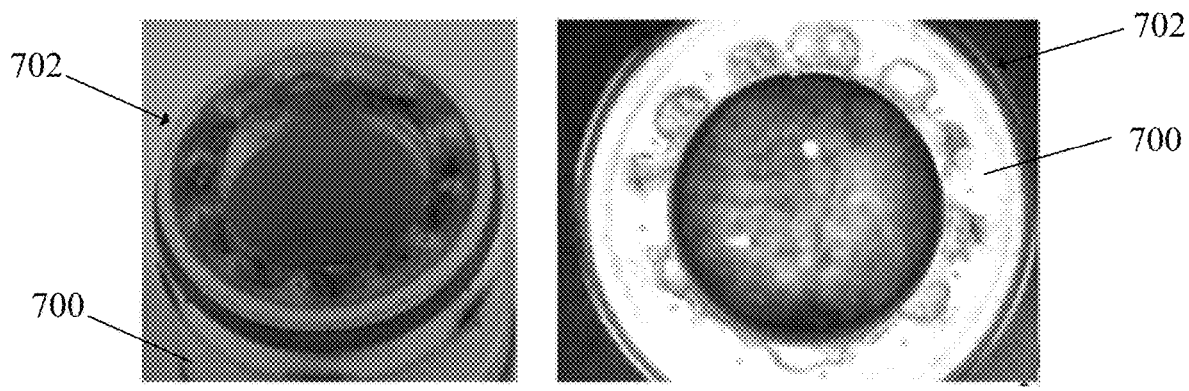
FIG. 7a FIG. 7b

SWIRL RING FOR A PLASMA ARC TORCH

CROSS REFERENCE TO RELATED APPLICATION

This application claims the benefit of and priority to U.S. Provisional Patent Application No. 62/438,538, filed Dec. 23, 2016, the entire contents of which is owned by the assignee of the instant application and incorporated herein by reference in its entirety.

TECHNICAL FIELD

The present invention generally relates to consumables for a plasma arc torch, and more particularly, to swirl rings of plasma arc torches constructed from oxygen-stable polymers.

BACKGROUND

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

FIG. 1 is a perspective view of a prior art swirl ring 100 for a plasma arc torch. The swirl ring 100 includes two grooves 102, 104 configured to retain an O-ring (not shown) therebetween. The O-ring is used by the swirl ring 100 to prevent unmetered air from entering its swirl chamber and disrupting the plasma gas swirl pattern in the swirl chamber. As shown, each of the grooves 102, 104 is circumferentially disposed on an interior surface 108 of the hollow body of the swirl ring 100. Each of the grooves 102, 104 comprises a consistent wall projecting inward from the interior surface 108 of the swirl ring 100, where the consistent wall supports and locates the O-ring within the swirl ring. To manufacture the grooves 102, 104, a groove tool is typically used to machine an undercut 106 in the body of the swirl ring 100 from the interior surface 108, which increases the time and cost of manufacturing the swirl ring 100.

In addition, prior art swirl rings (e.g., the swirl ring 100 of FIG. 1) are typically made from ceramic-based materials, such as hydrous aluminum silicate (i.e., lava). A ceramic-based material is capable of being machined in its green state, but requires firing to bake the material into a stable ceramic material. This type of ceramic-based material also has unstable composition (e.g., mined organic material) that can result in high defect rates during swirl ring production. Thus suitability testing is needed to determine how each batch of new material behaves during firing operations. Even though other machine-able ceramic materials that do not require firing are available, they are cost prohibitive and are not commonly used to produce swirl rings. Further, because prior art swirl rings can be used in a pure oxygen ($O_2$) environment within plasma arc torches where electric arc ignition occasionally passes across a swirl ring, this causes swirl rings having polymeric materials that contain a carbon chain to readily burn when ignited, which usually results in the destruction of the torch body and possibly the torch receptacle.

Thus, there is a need for swirl rings that can be manufactured with reduced costs and time and have improved properties that allow them to withstand conditions having a combustible operating atmosphere.

SUMMARY

The present invention provides one or more cost effective swirl ring designs that are also chemically stable. In some embodiments, the present invention features a swirl ring injection molded from one or more oxygen stable polymers, where the swirl ring has injection-molded features for retaining an O-ring. Creating such a swirl ring does not require additional machining. For example, one or more sets of injection moldable flange segments are constructed along an inner wall of the injection moldable swirl ring to hold an O-ring in place. The flange segments can have a staggered pattern, which are robust enough to retain the O-ring, but fully moldable during the construction of the swirl ring such that no additional machining steps are needed.

The invention, in one aspect, features a swirl ring for a plasma arc torch. The swirl ring comprises a hollow body having a distal end and a proximal end and configured to receive at least a portion of an electrode within the hollow body. The proximal end is configured to attach to a torch body of the plasma arc torch and the distal end is configured to attach to a nozzle of the plasma arc torch. The hollow body defines a longitudinal axis extending from the proximal end to the distal end. The swirl ring also comprises a first set of flange segments circumferentially disposed on an interior surface of the hollow body. The first set of flange segments extend radially inward from the interior surface and shaped to retain a first surface of a sealing member. The swirl ring further comprises a second set of flange segments circumferentially disposed on the interior surface of the hollow body. The second set of flange segments extend radially inward from the interior surface and shaped to retain a second surface of the sealing member. The second set of flange segments are spaced distally from the first set of flange segments along the longitudinal axis, and flange segments of the second set of flange segments are radially offset from flange segments of the first set of flange segments.

In another aspect, a swirl ring for a plasma arc torch is prepared by a process comprising injection molding a stable polymer material to form a hollow body having a distal end and a proximal end and defining a longitudinal axis extending from the proximal end to the distal end. The process also comprises injection molding the stable polymer material to form a first set of flange segments circumferentially disposed on an interior surface of the hollow body. The first set of flange segments extend radially inward from the interior surface and shaped to retain a first surface of a sealing member. The process further comprises injection molding the stable polymer material to form a second set of flange segments circumferentially disposed on the interior surface of the hollow body. The second set of flange segments extend radially inward from the interior surface and shaped to retain a second surface of the sealing member. The second set of injection molded flange segments are spaced distally from the first set of injection molded flange segments along the longitudinal axis, and flange segments of the second set of injection molded flange segments are radially offset from flange segments of the first set of injection molded flange segments.

In some embodiments, the injection molding of the hollow body, the first set of flange segments and the second set of flange segments occur simultaneously. In some embodiments, the stable polymer material comprises at least one of silicone or a fluoropolymer. The fluoropolymer can be fluorinated ethylene propylene (FEP).

Any of the above aspects can include one or more of the following features. In some embodiments, the hollow body, the first set of flange segments and the second set of flange segments are injection molded. In some embodiments, the hollow body, the first set of flange segments and the second set of flange segments are molded from a stable polymer comprising silicone or fluoropolymer. At least one flange segment in the first set of flanges can comprise a protrusion or indent for injection molding marking.

In some embodiments, the sealing member is an O-ring. In some embodiments, the distal spacing between the first and second sets of flange segments corresponds to a width of the sealing member.

In some embodiments, the first set of flange segments and the second set of flange segments are located radially in an alternating fashion about the longitudinal axis. In some embodiments, the first set of flange segments and the second set of flange segments do not radially or axially overlap. In some embodiments, the radial offset between the flange segments of the first and second sets of flange segments comprises the flange segments of the first set of flange segments not overlapping with the flange segments of the second set of flange segments when viewed from at least one of the proximal end or the distal end of the hollow body.

In some embodiments, the first set of flange segments comprises four distinct flange segments. In some embodiments, the second set of flange segments comprises four distinct flange segments.

In some embodiments, the distal end of the swirl ring includes one or more recessed regions. In some embodiments, a cross-section of the swirl ring that is perpendicular to the longitudinal axis is oblong in shape.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 6a-c show the conditions of various consumables in a plasma arc torch after induced combustion of swirl rings manufactured from different materials, according to an illustrative embodiment of the present invention.

FIGS. 7a and 7b show an exemplary injection-molded fluoropolymer swirl ring after 150 starts and 552 starts, respectively, in a pure oxygen torch environment, according to an illustrative embodiment of the present invention.

DETAILED DESCRIPTION

Figure 2:
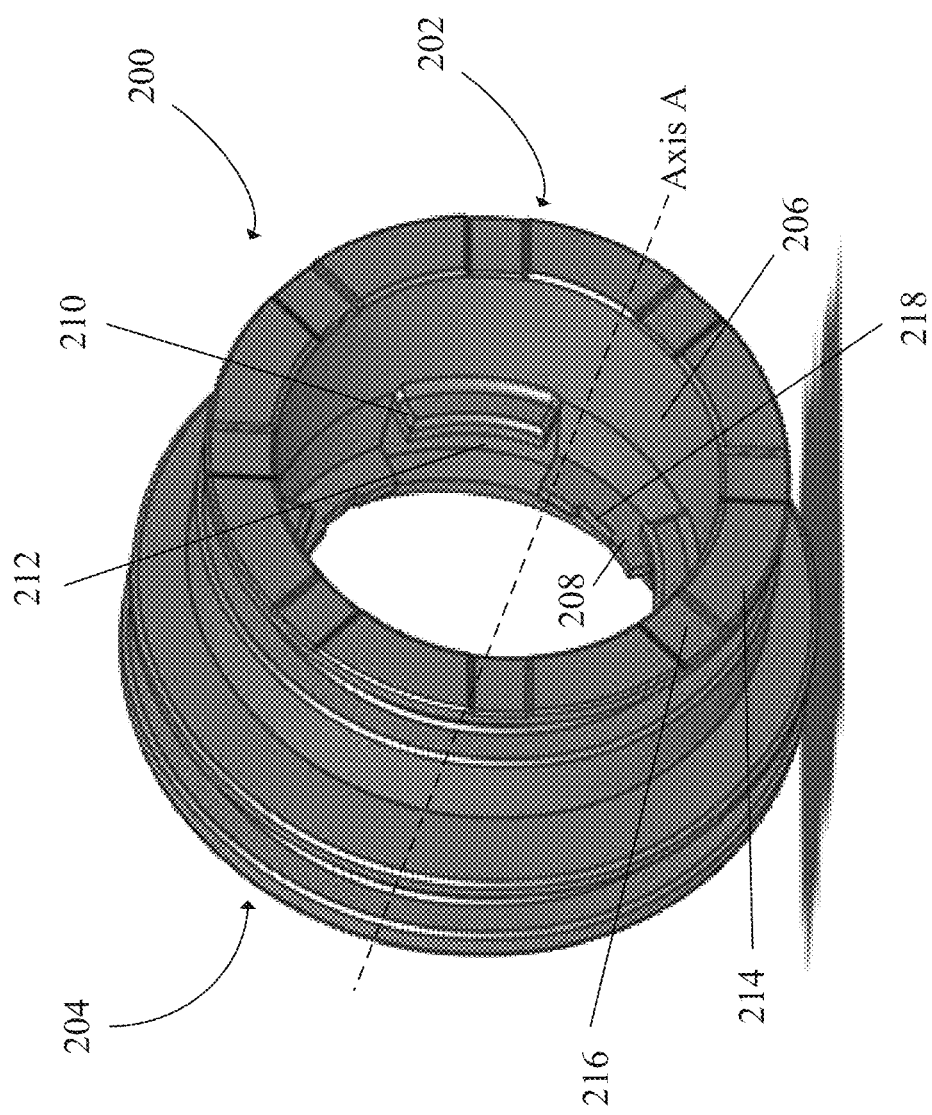
FIG. 2 is a perspective view of an exemplary swirl ring, according to an illustrative embodiment of the present invention.

FIG. 2 is a cross-sectional view of an exemplary swirl ring 200, according to an illustrative embodiment of the present invention. As shown, the swirl ring 200 includes a substantially hollow, elongated body having a distal end 202, a proximal end 204 and a central longitudinal axis A extending between the distal end 202 and the proximal end 204. The hollow body of the swirl ring 200 is dimensioned to receive at least a portion of an electrode (not shown). The distal end 202 of the swirl ring 200 is characterized as the end that is closest to a workpiece when the plasma arc torch and is configured to attach to a nozzle (not shown) of the plasma arc torch. The proximal end 204 of the swirl ring 200 is opposite of the distal end 202 and is configured to attach to a torch body (not shown) of the plasma arc torch. In some embodiments, a cross section of the swirl ring 200 perpendicular to the longitudinal axis A is oblong in shape before it is assembled into the plasma arc torch. This cross-sectional shape can become rounded when it is assembled into the plasma arc torch.

In some embodiments, a first set of flange segments 208 is disposed about an interior surface 206 of the hollow body of the swirl ring 200, such as around a first circumference in the interior surface 206 near the proximal end 204. The first set of flange segments 208 can be disposed evenly around the first circumference and each flange segment 208 can extend radially inward (i.e., toward the central longitudinal axis A) from the interior surface 206. In some embodiments, the first set of flange segments 208 comprises four distinct flange segments. In other embodiments, the first set of flange segments 208 comprises more or fewer number of flange segments, depending on the dimension of the first circumference. In addition, a second set of flange segments 210 is disposed about an interior surface 206 of the hollow body of the swirl ring 200, such as around a second circumference in the interior surface 206 that is spaced distally from the first set of flange segments 210 along the longitudinal axis A. The second set of flange segments 210 can be disposed evenly around the second circumference and each flange segment 210 can extend radially inward (i.e., toward the central longitudinal axis A) from the interior surface 206. In some embodiments, the second set of flange segments 210 comprises four distinct flange segments. In other embodiments, the second set of flange segments 210 comprises more or fewer number of flange segments, depending on the dimension of the second circumference. The second set of flange segments 210 may include the same number of flange segments as or different number of flange segments from the first set 208.

In some embodiments, the first and second sets of flange segments 208, 210 are configured to cooperatively position and retain a sealing member (not shown), such as an O-ring, against the interior surface 206 of the body of the swirl ring 200. Specifically, the first set of flange segments 208 is shaped to physically contact and retain a first surface (e.g., the top surface) of the sealing member and the second set of flange segments 210 is shaped to physically contact and retain a second surface (e.g., the bottom surface) of the sealing member, such that the sealing member is sandwiched in the receptacle 212 between the two sets of flange segments 208, 210. Thus, the distal spacing in the receptacle 212 is approximately the width of the sealing member for snuggly capturing the sealing member. In some embodiments, the first set of flange segments 208 axially restrains the movement of the sealing member in a direction away from the distal end 202 (i.e., toward the proximal end 204), and the second set of flange segments 210 axially restrains the movement of the sealing member in a direction toward the distal end 202. In some embodiments, the receptacle 212 is not machined (e.g., cut) into the body of the swirl ring 200, but is inherently created by the two sets of flange segments 208, 210 in the longitudinal direction and a portion of the inner surface 206 in the radial direction.

In some embodiments, the flange segments of the second set of flange segments 210 are radially offset from the flange segments of the first set of flange segments 208, such that each of the second set of flange segments 210 does not overlap with a flange segment 208 of the first set of flange segments 210 when viewed from at least one of the proximal end 204 or the distal end 202 of the hollow body of the swirl ring 200. Thus, the first set of flange segments 208 and the second set of flange segments 210 can be located radially in an alternating/staggered fashion about the longitudinal axis A. In some embodiments, the first set of flange segments 208 and the second set of flange segments 210 do not radially or axially overlap. Due to the alternating arrangement, an operator can easily detect the presence of a sealing member once it is seated in in the receptacle 212 because of the unobstructed line of sight to the sealing member from the proximal end 204 and/or the distal end 202 of the swirl ring 200, which facilitates quality control.

In some embodiments, the end face at the distal end 202 of the swirl ring 200 includes one or more recessed regions 214 (i.e., recessed with respect to the longitudinal axis A) interspersed among one or more raised regions 216 (i.e., raised with respect to the longitudinal axis A). Thus the end face lacks evenness/smoothness. This rugged end face is configured to ensure proper alignment and interface of the swirl ring 200 with the nozzle when the nozzle is attached to the swirl ring 200. For example, the end face of the distal end 202 of the swirl ring 200 can capture complementary features of the nozzle through one of snap fit or crimping.

Figure 1:
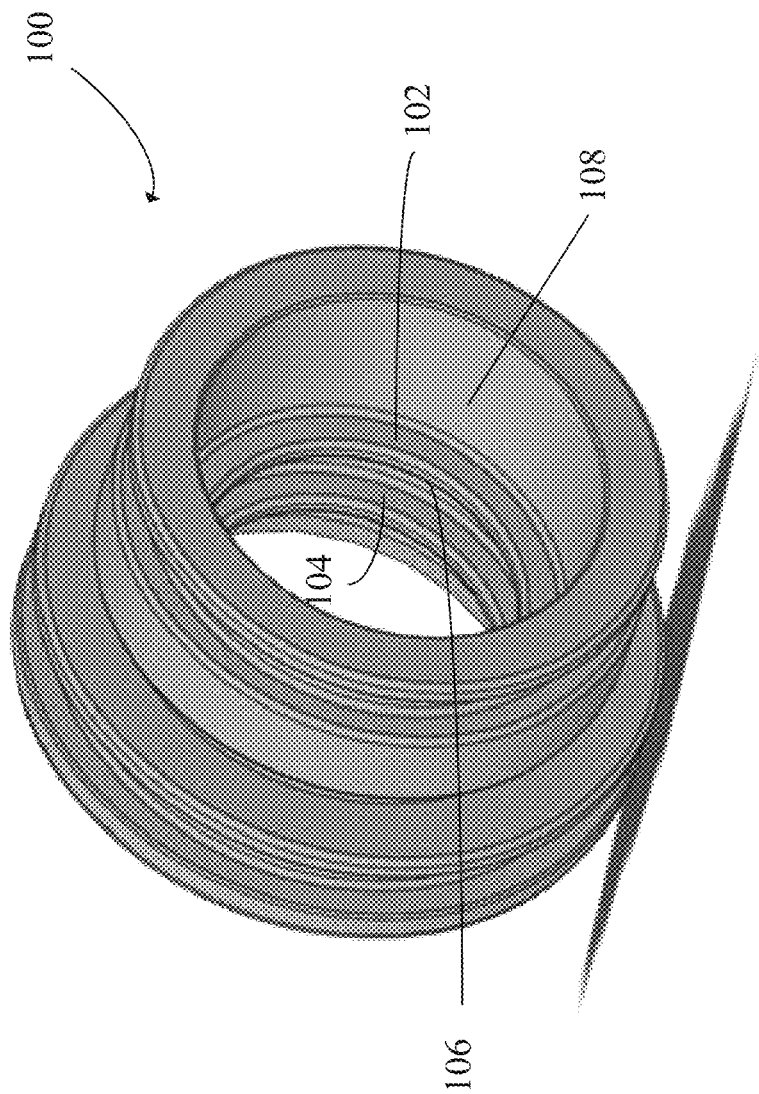
FIG. 1 is a perspective view of a prior art swirl ring for a plasma arc torch.

In some embodiments, the swirl ring 200, including the hollow body, the first set of flange segments 208 and the second set of flange segments 210, is manufactured through injection molding. This fully moldable swirl ring 200 thus reduces machining needs. Specifically, unlike traditional swirl rings (e.g., the swirl ring 100 of FIG. 1), no additional machining step is needed to create features in the body of the swirl ring to retain a sealing member. To facilitate injection molding of the swirl ring 200, at least one flange segment in the first set of flange segments 208 comprises a protrusion or indent for injection molding marking 218. During injection molding, a material can be injected through a hole to form the swirl ring 200. When the hole is closed at the end of injection molding, it can leave a small protrusion on the surface of the molded part, which can extend into the inner diameter of the swirl ring 200 to affect fluid flows therethrough and/or damage the swirl ring 200. The marking 218 thus prevents this protrusion from extending into the swirl ring 200. In some embodiments, at least one flange segment in the second set of flange segments 210 comprises a similar protrusion or indent for injection molding marking (not shown).

In another aspect, the material used to injection mold the swirl ring 200 comprises one or more stable polymers, which can be resistant to combustion in an arc-ignition oxygen environment, thus remedying the deficiencies noted above with respect to using ceramic-based materials in traditional swirl ring designs. Exemplary stable polymers that are usable to injection mold the swirl ring 200 include rigid silicone (e.g., thermoset) and fluoropolymers (e.g., a thermoplastic such as fluorinated ethylene propylene (FEP)). Unlike ceramic-based materials, rigid/heavily-filled silicone does not have any carbon chain in its chemistry and is thus not combustible in a pure oxygen ($O_2$) environment. Even though a fluoropolymer includes a carbon chain, the large size of the fluorine atoms in the fluoropolymer force their arrangement into a tightly packed spiral around a carbon backbone with only strong bonds of C—F and C—C, thus reducing the susceptibility of the fluoropolymer to $O_2$ reactions. As such, swirl rings manufacturing using injection molding from these stable polymers have the following advantages: (i) more robust and less brittle than swirl rings made from green or fired ceramics, such as aluminum silicate, so that they are less likely to break if dropped (ii) more complex design potentials, greater design geometry flexibility, and thinner wall sections than what is achievable using ceramics, and (iii) significant cost reduction from less processing time due to the use of injection molding and less suitability testing time due to the use of stable polymers. Further, injection molded swirl rings using stable polymer materials are more consistent in their mechanical and functional properties than machined ceramic swirl rings because they do not burn in arc-ignition oxygen environments.

Figure 3:
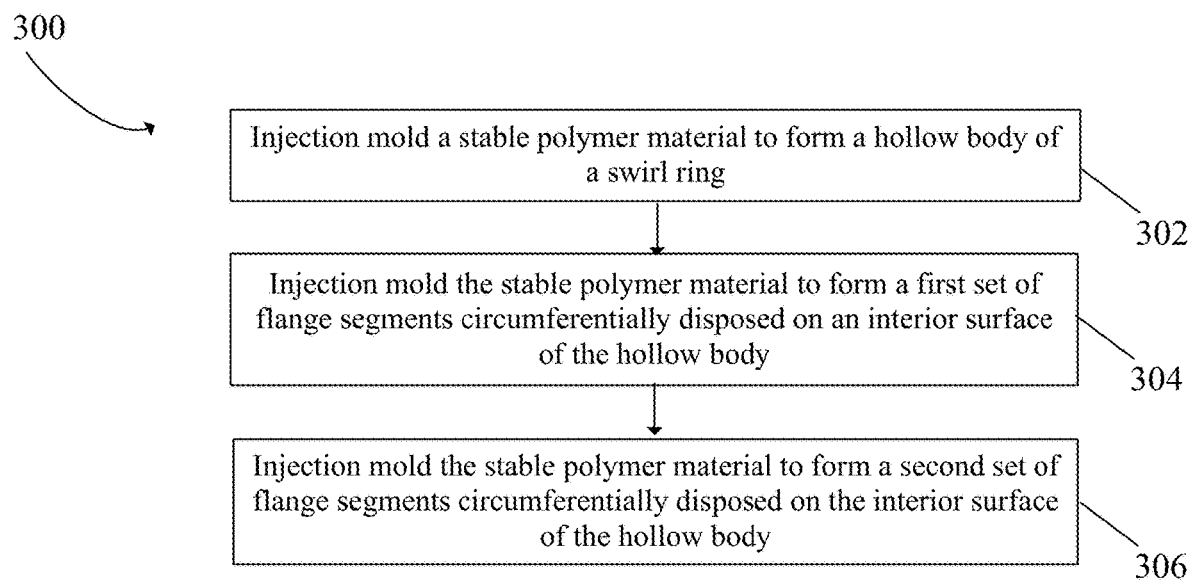
FIG. 3 is an illustrative injection molding process for constructing the swirl ring of FIG. 2, according to an illustrative embodiment of present the invention.

FIG. 3 is an illustrative injection molding process 300 for constructing the swirl ring 200 of FIG. 2, according to an illustrative embodiment of the present invention. The process starts with the injection molding of a stable polymer material as described above (e.g., silicone and/or a fluoropolymer) to form the hollow body of the swirl ring 200 (step 302). Injection molding of the same stable polymer material is also used to form the first set of flange segments 208 circumferentially disposed on the interior surface 206 of the hollow body of the swirl ring 200 (step 304). Injection molding of the same stable polymer material is further used to form the second set of flange segments 210 circumferentially disposed on the interior surface 206 of the hollow body of the swirl ring 200 (step 306). The injection molding of the hollow body, the first set of flange segments 208 and the second set of flange segments 210 can occur substantially simultaneously in a single manufacturing process without additional machining. In some embodiments, the marking 218, in the form of an indent or protrusion, minimizes impact on fluid flows and/or potential damage to the swirl ring 200 caused by the use of the injection molding technique, as explained above.

Table 1 below shows the effectiveness of the swirl ring 200 in retaining an O-ring, thereby sealing and preventing liquid from flowing downstream to a plasma chamber (not shown) situated between the electrode and the nozzle of the plasma arc torch once the swirl ring 200 is installed into the torch. Specifically, Table 1 shows a comparison of the sealing effectiveness between the swirl ring 200 of FIG. 2 and the prior art swirl ring 100 of FIG. 1 based on pressure loss tests conducted for a plasma arc torch with the swirl ring 100 (producing the "baseline" results of Table 1) and a plasma arc torch with the swirl ring 200 (producing the "moldable O-ring" results of test 1). Each test involves pressuring the plasma arc torch, sealing the torch using an O-ring disposed in the corresponding swirl ring, and recording the start and end pressures after 2 minutes. As shown in Table 1, the average pressure loss for the injection molded swirl ring 200, which is 14.9 psi, is comparable to the average pressure loss for the prior art swirl ring 100, which is 16.2 psi. Thus the swirl ring 200 of FIG. 2 is comparable in sealing effectiveness as the prior art swirl ring 100 of FIG. 1.

TABLE 1

Pressure Loss Test Results

| | Pressure Loss over 2 min | | | | | |
|---|---|---|---|---|---|---|
| | Baseline | | | Moldable O-Ring | | |
| | Start (psi) | End (psi) | Loss (psi) | Start (psi) | End (psi) | Loss (psi) |
| Test 1 | 132.2 | 116.4 | 15.8 | 132.0 | 116.5 | 15.5 |
| Test 2 | 131.7 | 114.1 | 17.6 | 131.4 | 116.7 | 14.7 |
| Test 3 | 131.3 | 116.0 | 15.3 | 131.2 | 116.7 | 14.5 |
| Average | 131.7 | 115.5 | 16.2 | 131.5 | 116.6 | 14.9 |

Figure 4:
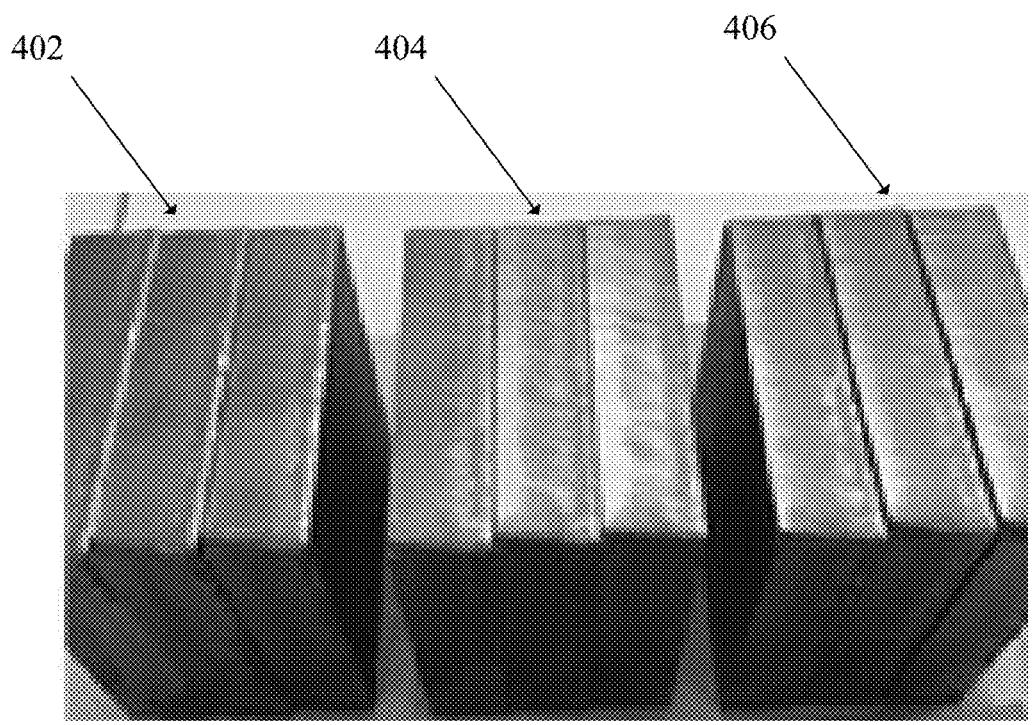
FIG. 4 shows cut quality test results obtained using traditional and injection molded swirl rings, according to an illustrative embodiment of the present invention.

Another test is performed involving a swirl ring injection molded from 30% glass-bead filled fluorinated ethylene propylene (FEP) and a swirl ring injection molded from 30% glass-bead filled perfluoroalkoxy alkane (PFA), where both swirl rings are fluoropolymer materials with substantially the same structure as the swirl ring 200 of FIG. 2. FIG. 4 shows cut quality test results obtained using these injection molded swirl rings, according to an illustrative embodiment of the present invention. Specifically, FIG. 4 shows three sets of squares 402, 404, 406 cut with a prior art swirl ring made from lava (similar to the swirl ring 100 of FIG. 1), the PFA swirl ring, and the FEP swirl ring, respectively. The squares 402 cut by the prior art swirl ring show comparable cut quality, such as comparable dross and surface aesthetics, as the squares 404 and 406 cut by the PFA and FEP swirl rings. Thus these cut quality results demonstrate that the swirl ring design 200 of FIG. 2 manufactured from a moldable material (e.g., FEP or PFA) is able to provide adequate sealing and cut quality in comparison to a prior art swirl ring.

Figure 5A:
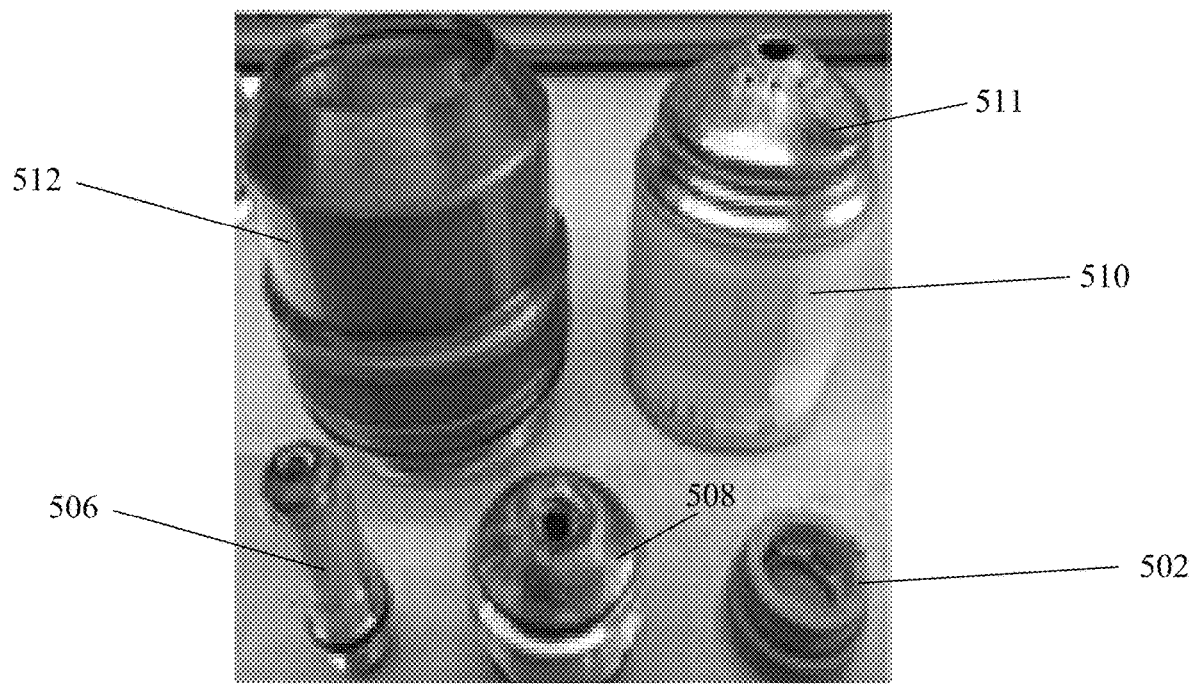
FIGS. 5a and 5b show the state of several injection molded swirl rings following an electrode blowout, according to an illustrative embodiment of the present invention.
Figure 5B:

FIGS. 5a and 5b show the state of the FEP swirl ring and the PFA swirl ring of FIG. 4, respectively, following an electrode blowout, according to an illustrative embodiment of the present invention. Specifically, FIG. 5a shows the FEP swirl ring 502, an electrode 506, a nozzle 508, an inner retaining cap 510 connected to a shield 511 and an outer retaining cap 512 after an electrode blowout event. As illustrated, the FEP swirl ring 502 is substantially intact and undamaged after the electrode blowout event. Similarly, FIG. 5b shows the PFA swirl ring 504, an electrode 514, a nozzle 516, an inner retaining cap 518 connected to a shield 519 and an outer retaining cap 520 after an electrode blowout event. As illustrated, the PFA swirl ring 504 is also substantially intact and undamaged after an electrode blowout. Specifically, the blowout event is produced using a test that is designed to rapidly fail consumables of a plasma arc torch via either a ramp-down error or shut off. Thus, these results indicate that fluoropolymer swirl rings are generally durable, able to survive an arc-ignition oxygen environment, able to maintain arc stability, and are dimensionally stable over life.

Figure 6A:
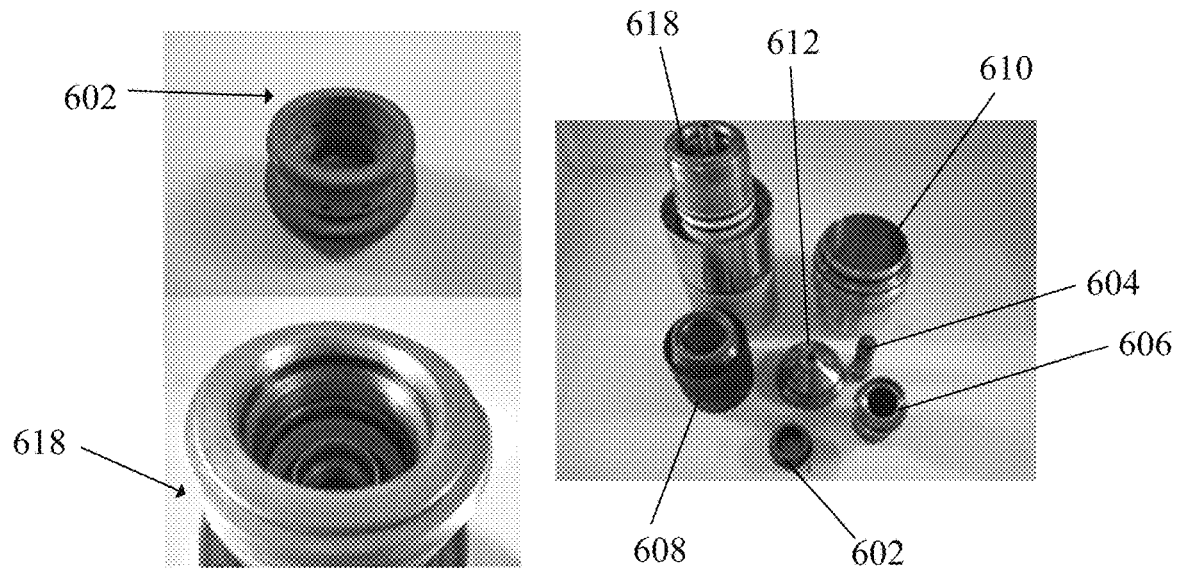
Figure 6B:
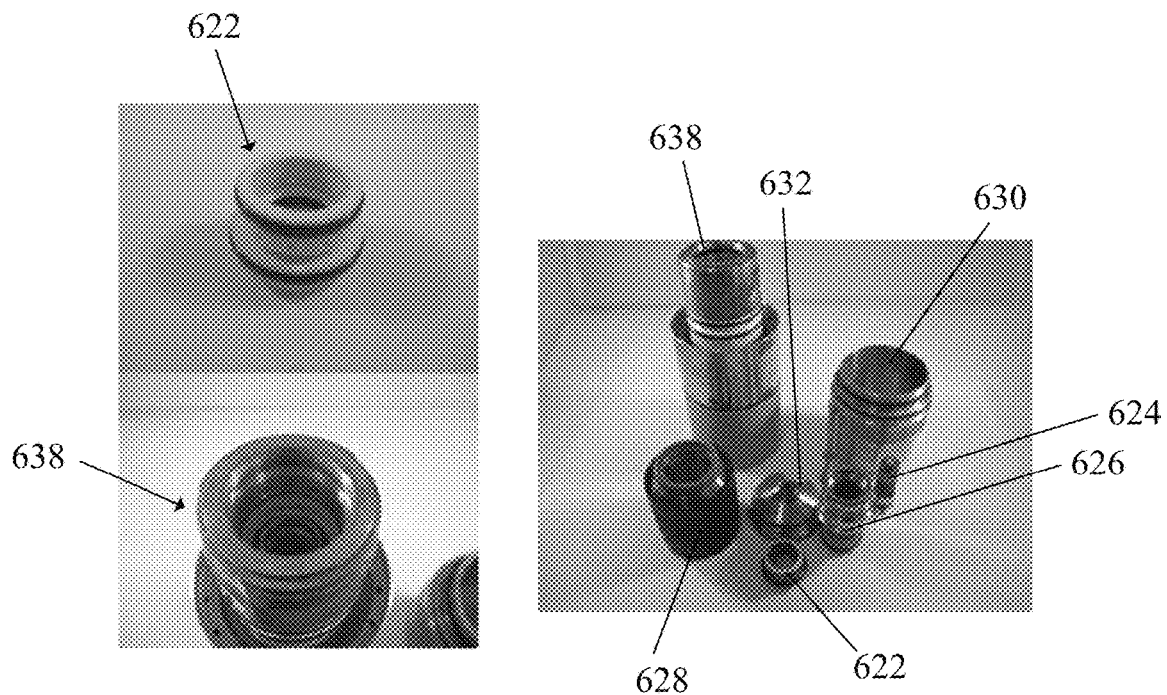

FIGS. 6a-c show the conditions of various consumables in a plasm arc torch after induced combustion of swirl rings manufactured from different materials, according to an illustrative embodiment of the present invention. Specifically, FIG. 6a shows a swirl ring 602 that is injection molded from red short fiberglass silicone, which is a stable polymer. After a propellant is applied to induce combustion of the swirl ring 602 within the plasma arc torch, the swirl ring 602 was destroyed. The electrode 604 and nozzle 606 were blackened, but did not appear to be significantly damaged. The inner and outer retaining caps 608, 610, shield 612, and liquid coolant tube (not shown) were undamaged. Further, the torch body 618 appears to have suffered minimal to no damage. FIG. 6b shows a swirl ring 622 that is injection molded from 40% glass-filled polytetrafluoroethylene (PTFE), which is also a stable polymer. After a propellant is applied to induce combustion of the swirl ring 622 within the plasma arc torch, the swirl ring 622 was destroyed. The electrode 624, nozzle 626 and shield 632 were blackened, but did not appear to be significantly damaged. The inner and outer retaining caps 628, 630 and liquid coolant tube (not shown) were undamaged. Further, the torch body 638 appears to have suffered minimal to no damage. FIG. 6c shows a swirl ring 642 that is machined from black fiberglass and mineral reinforced epoxy, which is not a stable polymer. After a propellant is applied to induce combustion of the swirl ring 642 within a plasma arc torch, the swirl ring 642, electrode 644, nozzle 646 and shield 652 were all destroyed. The inner and outer retaining caps 648, 650 and liquid coolant tube 654 were undamaged. Further, the torch body 658 appears to have suffered minimal damage, but there were some blackening and slight burning of the insulator. The results from FIGS. 6a-6c show that even though the propellant burning destroyed the swirl rings in all the test cases, the actual swirl ring material did not sustain enough flame to cause damage to the other consumables and especially not to the torch.

FIGS. 7a and 7b show an exemplary injection-molded fluoropolymer swirl ring 700 after 150 starts and 552 starts, respectively, in a pure oxygen torch environment, according to an illustrative embodiment of the present invention. The swirl ring 700 is made from 40% glass-filled PTFE and has a structure that is substantially the same as the swirl ring 200 of FIG. 2. FIG. 7a shows the quality of the swirl ring 700 after 150 starts, and FIG. 7b shows the quality of the same swirl ring 700 after 552 starts, which is when the consumable failed. As shown, the distal end 702 of the swirl ring 700, which is the end closest to the workpiece during torch operation, exhibits evidence of localized arc melting in both cases. However, this melting is attributed to the extreme heat of the plasma arcs during torch operations, not the pure oxygen environment. In fact, the swirl ring 700 did not continue to burn in the pure oxygen environment. These results thus demonstrate that the injection-molded fluoropolymer swirl ring 700 does not burn when directly exposed to plasma arc or cause massive damage to surrounding torch components. Swirling by the swirl ring 700 after about 50 pilot arcs showed only slight discoloration of the swirl ring, but no signs of material removal. Swirling by the swirl ring 700 after 1 hour of starts showed no damage to the swirl ring 700. In some embodiments, the swirl ring 700 is suitable for use in a plasma arc torch operated at 260 amps or less. The swirl ring 700 can also be suitable as a single-use swirl ring and/or being a component of a consumable cartridge of a plasma arc torch.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A swirl ring for a plasma arc torch, the swirl ring comprising:
a hollow body having a distal end and a proximal end and configured to receive at least a portion of an electrode within the hollow body, the proximal end configured to attach to a torch body of the plasma arc torch and the distal end configured to attach to a nozzle of the plasma arc torch, the hollow body defining a longitudinal axis extending from the proximal end to the distal end;
a first set of flange segments circumferentially disposed on an interior surface of the hollow body, the first set of flange segments extending radially inward from the interior surface and shaped to retain a first surface of a sealing member; and
a second set of flange segments circumferentially disposed on the interior surface of the hollow body, the second set of flange segments extending radially inward from the interior surface and shaped to retain a second surface of the sealing member,
wherein (i) the second set of flange segments are spaced distally from the first set of flange segments along the longitudinal axis, and (ii) flange segments of the second set of flange segments are radially offset from flange segments of the first set of flange segments.

2. The swirl ring of claim 1, wherein the hollow body, the first set of flange segments and the second set of flange segments are injection molded.

3. The swirl ring of claim 2, wherein the hollow body, the first set of flange segments and the second set of flange segments are molded from a stable polymer comprising silicone or fluoropolymer.

4. The swirl ring of claim 2, wherein at least one flange segment in the first set of flange segments comprises a protrusion or indent for injection molding marking.

5. The swirl ring of claim 1, wherein the sealing member is an O-ring.

6. The swirl ring of claim 5, wherein a distal spacing between the first and second sets of flange segments corresponds to a width of the sealing member.

7. The swirl ring of claim 1, wherein the first set of flange segments and the second set of flange segments are located radially in an alternating fashion about the longitudinal axis.

8. The swirl ring of claim 1, wherein the first set of flange segments and the second set of flange segments do not radially or axially overlap.

9. The swirl ring of claim 1, wherein the radial offset between the flange segments of the first and second sets of flange segments comprises the flange segments of the first set of flange segments not overlapping with the flange segments of the second set of flange segments when viewed from at least one of the proximal end or the distal end of the hollow body.

10. The swirl ring of claim 1, wherein the first set of flange segments comprises four distinct flange segments.

11. The swirl ring of claim 1, wherein the second set of flange segments comprises four distinct flange segments.

12. The swirl ring of claim 1, wherein the distal end includes one or more recessed regions.

13. The swirl ring of claim 1, wherein a cross-section of the swirl ring that is perpendicular to the longitudinal axis is oblong in shape.

14. A swirl ring for a plasma arc torch prepared by a process comprising:
injection molding a stable polymer material to form a hollow body having a distal end and a proximal end and defining a longitudinal axis extending from the proximal end to the distal end;
injection molding the stable polymer material to form a first set of flange segments circumferentially disposed on an interior surface of the hollow body, the first set of flange segments extending radially inward from the interior surface and shaped to retain a first surface of a sealing member; and
injection molding the stable polymer material to form a second set of flange segments circumferentially disposed on the interior surface of the hollow body, the second set of flange segments extending radially inward from the interior surface and shaped to retain a second surface of the sealing member,
wherein (i) the second set of injection molded flange segments are spaced distally from the first set of injection molded flange segments along the longitudinal axis, and (ii) flange segments of the second set of injection molded flange segments are radially offset from flange segments of the first set of injection molded flange segments.

15. The swirl ring of claim 14, wherein the injection molding of the hollow body, the first set of flange segments and the second set of flange segments occur simultaneously.

16. The swirl ring of claim 14, wherein the stable polymer material comprises at least one of silicone or a fluoropolymer.

17. The swirl ring of claim 16, wherein the fluoropolymer is fluorinated ethylene propylene (FEP).

18. The swirl ring of claim 14, wherein the sealing member is an O-ring.

19. The swirl ring of claim 14, wherein the radial offset between the flange segments of the first and second sets of injection molded flange segments comprises the flange segments of the first set of injection molded flange segments not overlapping with the the flange segments of the second set of injection molded flange segments when viewed from at least one of the proximal end or the distal end of the hollow body.

20. The swirl ring of claim 14, wherein the first set of injection molded flange segments comprises at least four distinct flange segments.

21. The swirl ring of claim 14, wherein the second set of injection molded flange segments comprises at least four distinct flange segments.

* * * * *